J. A. DEMUTH & W. H. WILLIS.
Door-Checks.

No. 147,227. Patented Feb. 3, 1874.

UNITED STATES PATENT OFFICE.

JOSEPH A. DEMUTH AND WILLIAM H. WILLIS, OF FOREST CITY, MISSOURI.

IMPROVEMENT IN DOOR-CHECKS.

Specification forming part of Letters Patent No. 147,227, dated February 3, 1874; application filed September 22, 1873.

*To all whom it may concern:*

Be it known that we, JOSEPH A. DEMUTH and WILLIAM H. WILLIS, of Forest City, county of Holt and State of Missouri, have invented certain new and useful Improvements in Door Brake and Buffer, of which the following is a specification:

This invention relates to a device to be attached to a door to serve the double purpose of a brake to hold the door in any desired position, and a buffer to prevent injury and deaden the noise when the door is opened violently against the wall. The invention consists in a roller, preferably of india-rubber, journaled in the forked end of a lever pivoted in a bracket attached to the door, the end of the lever opposite the roller being cam-shaped and pressing against a spring, the whole being so arranged that the roller may be turned down so as to run upon the floor and serve as a brake, or may be turned up so as to impinge against the wall and deaden the noise and prevent injury to the wall when the door is thrown back violently.

Figure 1:
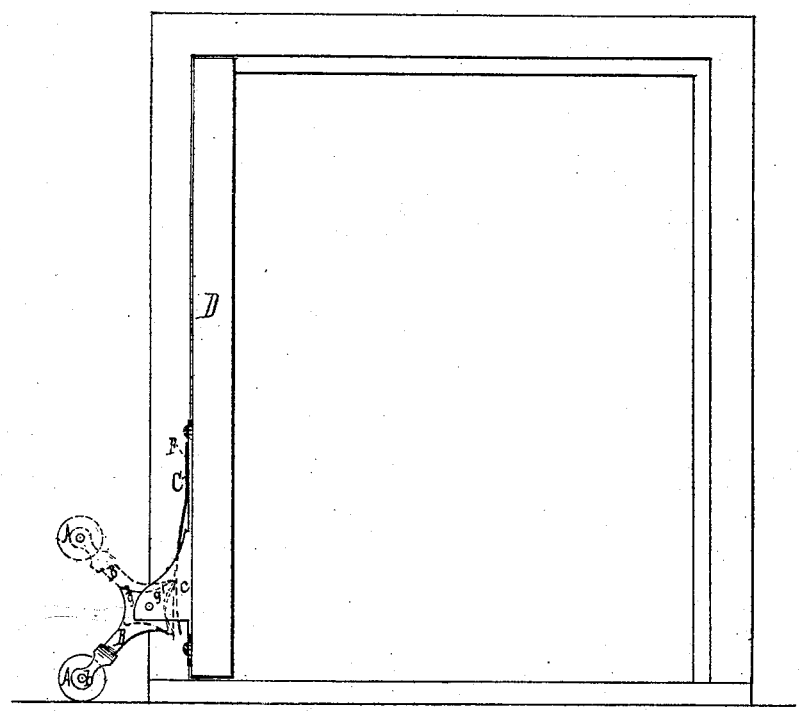
Figure 2:
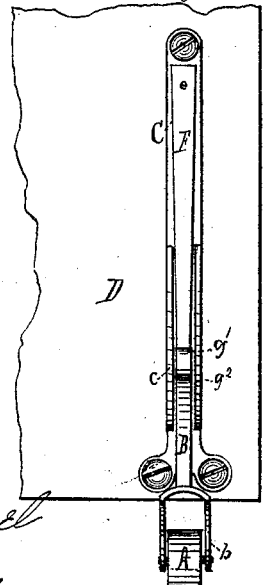

In the accompanying drawing, Figure 1 represents an edge view of a door with our improvement attached. Fig. 2 is a rear view of the same.

A represents a roller, preferably of india-rubber, or faced with india-rubber. This roller is journaled in the forked end $b$ of a lever, B, which is pivoted between two flanges, $c\,c$, of a bracket, C, attached to the rear side of a door, D, by screws or nails. F represents a flat spring, the upper end of which is secured to the upper end of the bracket C by a screw or rivet, the lower end being free, and curved outward between the flanges $c\,c$ of the bracket. The end of the lever B opposite the roller is enlarged and formed with two cam-surfaces, $g^1\,g^2$, which alternately bear against the lower end of the spring F, according as the roller is acting as a brake or a buffer.

When the roller is used as a brake to hold the door in different positions, it is turned down, as shown in full lines in Fig. 1, so as to run upon the floor, being held in position by the spring F pressing against the cam-surface $g^1$. When used only as a buffer, it is turned up, as shown in dotted lines, so that, if the door is opened violently and thrown back against the wall, the roller will impinge against the wall and roll upward so as to deaden the noise and prevent bruising or injuring of the wall, the spring F pressing against the cam-surface $g^2$ and holding the lever in position.

We claim as new, and desire to secure by Letters Patent—

The combined door brake and buffer, consisting of the roller A, the lever B pivoted between the flanges $c\,c$ and formed with the cam-surfaces $g^1\,g^2$, the spring F, and bracket C, all arranged and operating alternately as a brake or buffer, as herein shown and described.

In testimony that we claim the foregoing as our invention, we hereunto affix our signatures.

JOSEPH A. DEMUTH.
WILLIAM H. WILLIS.

Witnesses:
R. O. GRAVES,
O'NEIL GRAVES.